No. 816,247.  
PATENTED MAR. 27, 1906.

F. W. ORCHARD.  
SHADE CLOTH TRIMMER.  
APPLICATION FILED FEB. 20, 1905.

3 SHEETS—SHEET 1.

WITNESSES  
F. C. Tanner  
C. Macnamara

INVENTOR  
FREDERICK W. ORCHARD  
BY Paul & Paul  
HIS ATTORNEYS

No. 816,247. PATENTED MAR. 27, 1906.
F. W. ORCHARD.
SHADE CLOTH TRIMMER.
APPLICATION FILED FEB. 20, 1905.

3 SHEETS—SHEET 2.

WITNESSES
F. C. Tanner.
C. Mannmann

INVENTOR
FREDERICK W. ORCHARD
BY Paul & Paul
HIS ATTORNEYS.

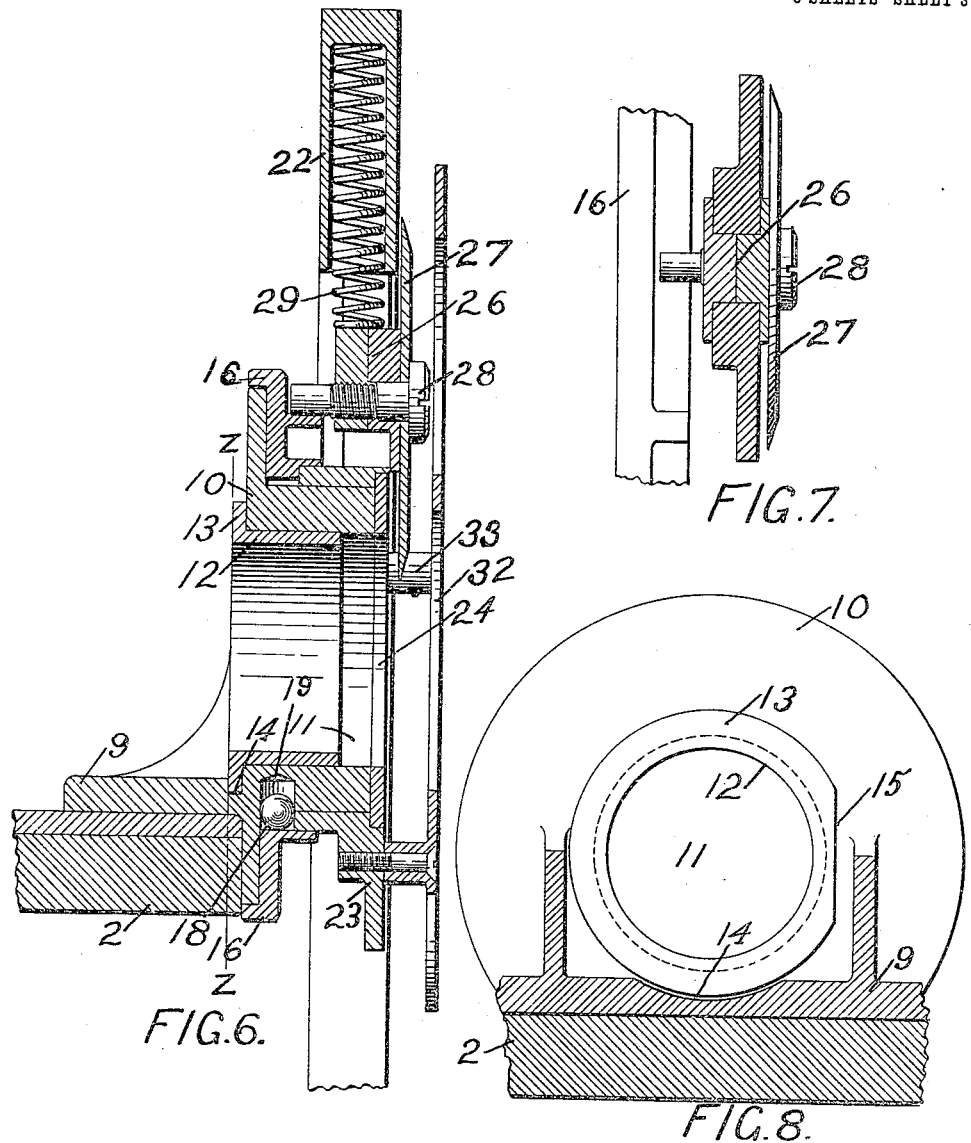

UNITED STATES PATENT OFFICE.

FREDERICK W. ORCHARD, OF MINNEAPOLIS, MINNESOTA.

SHADE-CLOTH TRIMMER.

No. 816,247. Specification of Letters Patent. Patented March 27, 1906.

Application filed February 20, 1905. Serial No. 246,361.

*To all whom it may concern:*

Be it known that I, FREDERICK W. ORCHARD, of Minneapolis, Hennepin county, Minnesota, have invented certain new and useful Improvements in Shade-Cloth Trimmers, of which the following is a specification.

My invention relates to machines for trimming shade-cloth without removing it from the roll or stick.

The object of my invention is to provide a simple and positively-acting mechanism for trimming the cloth and one that will be very accurate and can be easily operated and having but few parts and can be manufactured at a less cost than similar devices heretofore employed for this purpose.

The invention consists generally in various constructions and combinations, all as hereinafter described, and particularly pointed out in the claims.

Figure 1:
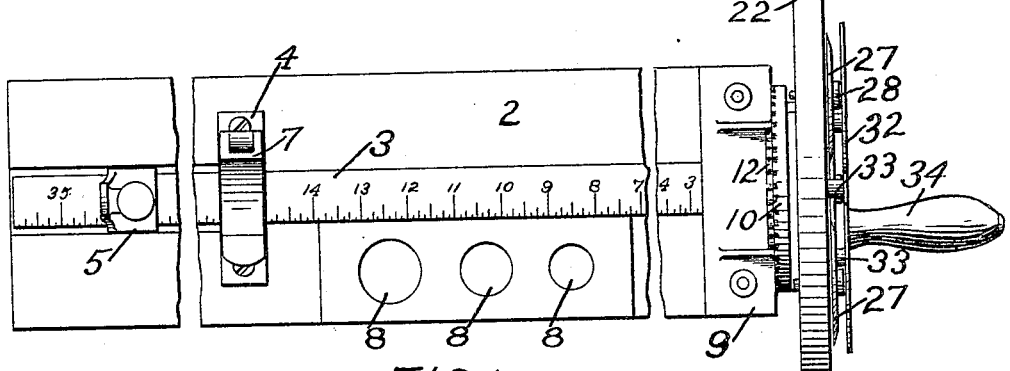
Figure 2:
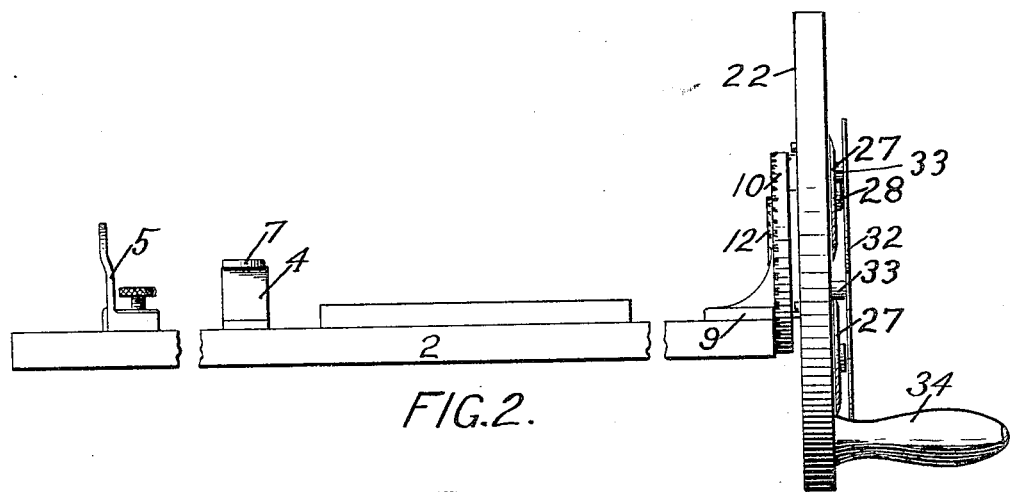
Figure 3:
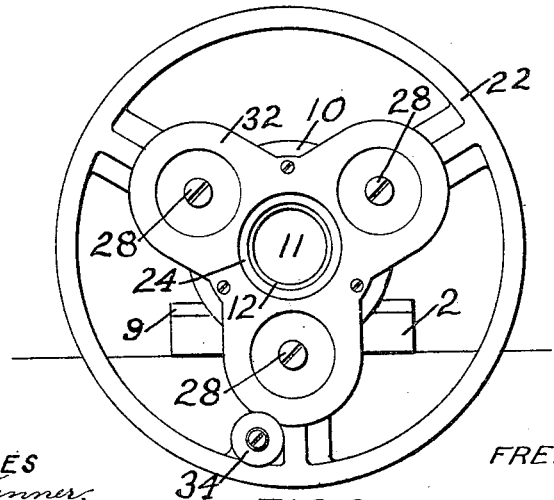
Figure 4:
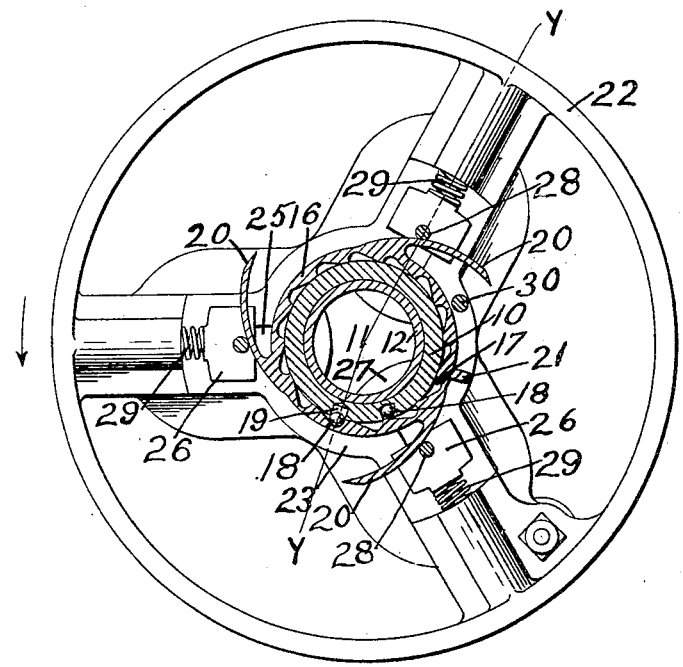
Figure 5:
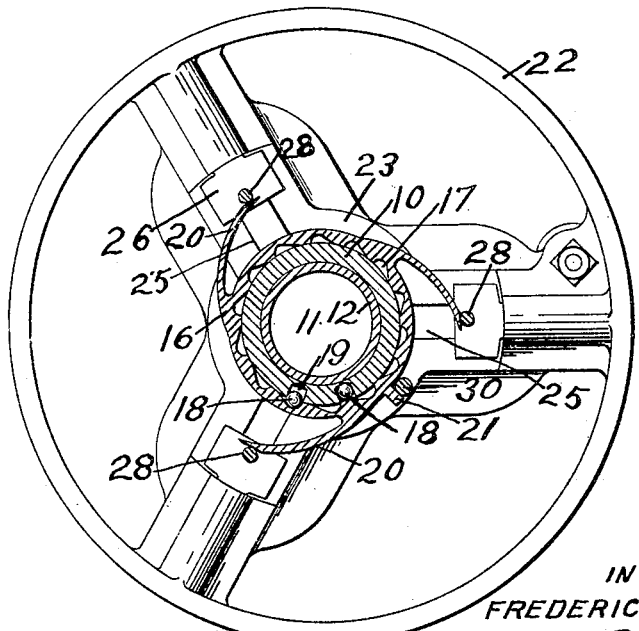

In the accompanying drawings, forming part of this specification, Figure 1 is a plan view of a shade-cloth trimmer embodying my invention. Fig. 2 is a side view of the same. Fig. 3 is an end view. Fig. 4 is a sectional view illustrating the mechanism for separating the trimming-knives and showing them in their closed or trimming position. Fig. 5 is a similar view showing the knives separated to receive the roll. Fig. 6 is a sectional view on the line $y\ y$ of Fig. 4. Fig. 7 is a sectional view through one of the knives and its support. Fig. 8 is a sectional view on the line $z\ z$ of Fig. 6. Fig. 9 is a detail view of the device mounted on the trimmer-board to support the roll.

In the drawings, 2 represents a board or plate provided with a measuring-stick 3 and support 4 for the roll and an adjustable stop device 5, that is set up against the end of the roll preparatory to trimming the opposite end. The rest 4 has a hinged part 7, that is adapted to be turned back when a large-sized roll is being trimmed and swung over upon the rest proper preparatory to trimming a small roll, thereby raising the level of the same to compensate for the difference in diameter. A series of holes 8, varying in size, are provided in the board 2, wherein the end of the roll is inserted to even the cloth on the stick preparatory to the trimming operation. Upon one end of the board a bracket 9 is mounted, having a hub 10 provided with an opening 11, into which the end of the roll to be trimmed is inserted.

To accommodate the device for rolls of different size, I prefer to provide a bushing 12, that is adapted to slip into the hole 11 and is provided with a flange 13, that enters a recess 14 in the base of the bracket and is locked against slipping accidentally out of the hub. A flat surface 15 is provided, however, in the flange 13 on one side of the bushing to permit its insertion into the hub and its removal therefrom. After the bushing is put in place it is rotated slightly to move the flat surface away from the recesses in the bracket, and then the bushing will be securely locked and cannot be removed until the flat surface again is turned to coincide with said recess. A ring 16 is mounted on the said hub to turn freely thereon and is provided with a series of interiorly-arranged pockets 17, that have square walls on one side and inclined walls on the other and are adapted to receive locking-balls 18, that are loosely arranged in recesses 19 in the periphery of the hub. These balls allow the ring to be turned freely in one direction, but lock it against movement in the other direction. A series of cams 20 are provided on the periphery of said ring at regular intervals, and a stop 21 is also provided on said ring between two of the cams. There may be any desired number of these cams, depending upon the number of knives used; but I prefer to employ three, each cam being cast with the ring upon which it is supported.

A wheel 22 has its hub 23 mounted on the hub 10 and held in place thereon by a clamping-ring 24. A series of knife-guideways 25 are provided in said wheel, radiating from the center thereof and carrying guide-blocks 26, whereon circular knives 27 are secured by means of screws 28. The ends of these screws are smooth, as shown in Fig. 7, and project through and beyond the guide-blocks and are adapted to engage and ride upon the cam-surfaces when the wheel is revolved in one direction. Springs 29 normally hold the knives and blocks projected toward the center of the wheel. A pin 30 is mounted on the said wheel in position to engage the stop 21 and limit the revolution of the wheel in one direction. A guard-plate 32 is secured to studs 33 on the face of the wheel and covers the edges of the knives and protects the operator from accidental injury, but at the same time permits access to the screws 28 to allow the removal or adjustment of the knives. As before stated, these knives are circular in form and are normally stationary on their support, so that only a small portion of their edge contacts with the shade-cloth. When this portion becomes dulled by frequent use, the screws 28 are loosened and the knives readjusted to expose another portion to the cloth. In this way the knives are kept sharp very much longer than would be possible if they were loosely mounted and allowed to revolve freely and expose their entire cutting edge to the cloth each time that the trimmer was operated. It is only necessary to change the adjustment of the knives very slightly to bring a new edge into use, and I have found that by mounting the knives in this way a very large number of shade-cloths can be trimmed before the knives require any attention. A suitable handle 34 is mounted on the wheel for convenience in revolving the same.

To operate the machine, the operator grasps the handle or the periphery of the wheel and turns it backward. One of the balls 18 will drop into a pocket 17 and lock the ring against backward revolution, and then as the wheel is free to turn in that direction the ends of the supporting-screws 28 will slide up on the cam-surfaces until the pin 30 engages the stop 21, at which point further backward movement of the wheel will cease and the knives will be separated sufficiently to allow the insertion of the shade-cloth roll between them. Then the operator will revolve the wheel forward, temporarily arresting with one hand revolution of the ring until the ends of the locking-screws slide down off the cam-surfaces and allow the knives to return to their normal position and engage the cloth to trim the edges of the same. The knives are then separated to allow the removal of the roll, and the operation described may be repeated.

I claim as my invention—

1. A shade-cloth trimmer comprising a revolving member provided with an opening to receive the end of a shade-cloth roll, radially-movable knives carried by said member and yieldingly held toward said opening, and mechanism for separating said knives when said member is turned backward to allow the insertion of the roll between them, substantially as described.

2. A shade-cloth trimmer comprising a revolving member having a central opening and a series of radially-movable knives surrounding said opening, a series of cam-surfaces arranged to revolve with said member in one direction but locked against revolution in the other direction, and means engaging said cam-surfaces to separate said knives when said member is revolved backward.

3. In a shade-cloth trimmer, the combination, with a hub, of a sleeve having cam-surfaces mounted thereon and adapted to revolve freely in one direction but locked against revolution in the other direction, a revolving member mounted on said hub and having an opening coinciding with an opening in said hub, spring-pressed radially-movable guide-blocks carried by said member, knives for said blocks, and screws passing through said knives and blocks and having ends adapted to engage said cam-surfaces when said member is turned backward.

4. A shade-cloth trimmer comprising a revolving member having an opening to receive the end of a shade-cloth roll, spring-pressed radially-movable guide-blocks carried by said member, and circular knives secured on said blocks and normally fixed but capable of adjustment to expose new cutting edges to the cloth.

5. In a shade-cloth trimmer, a revolving member having an opening to receive a shade-cloth roll, a series of spring-pressed radially-movable blocks carried by said member, knives secured on said blocks, and a guard-plate supported on said member in a plane parallel with the plane of said knives and covering the edges thereof and having openings through which the securing means for said knives is accessible, substantially as described.

6. In a shade-cloth trimmer, a hub having an opening to receive the end of a shade-cloth roll, a revolving member having an opening coinciding with the one in said hub, knives carried by said member and inclosing said opening, and a bushing removably fitting in said hub, for the purpose specified.

7. In a shade-cloth trimmer, the combination, with a hub, of a sleeve having cam-surfaces mounted thereon, means interposed between said sleeve and hub to allow the free revolution of said hub in one direction but lock it against movement in the other direction, a revolving member mounted on said hub and having an opening coinciding with an opening in said hub, radially-movable knives carried by said member and having means to engage said cam-surfaces when said member is turned backward, for the purpose specified.

8. In a shade-cloth trimmer, the combination, with a hub, of a sleeve having cam-surfaces mounted thereon, locking-balls fitting within recesses in said hub and adapted to engage said ring and lock it against movement in one direction but allow it to turn freely in the other direction, a revolving member on said hub and having an opening coinciding with the opening therein, and spring-pressed radially-movable knives carried by said member and having means for engaging said cam-surfaces when said member is turned backward to separate said knives, substantially as described.

In witness whereof I have hereunto set my hand this 15th day of February, 1905.

FREDERICK W. ORCHARD.

Witnesses:
RICHARD PAUL,
C. MACNAMARA.